July 5, 1927. Re. 16,669
S. KAYE
COOLER FOR BOTTLED GOODS
Original Filed May 25, 1922 3 Sheets-Sheet 1
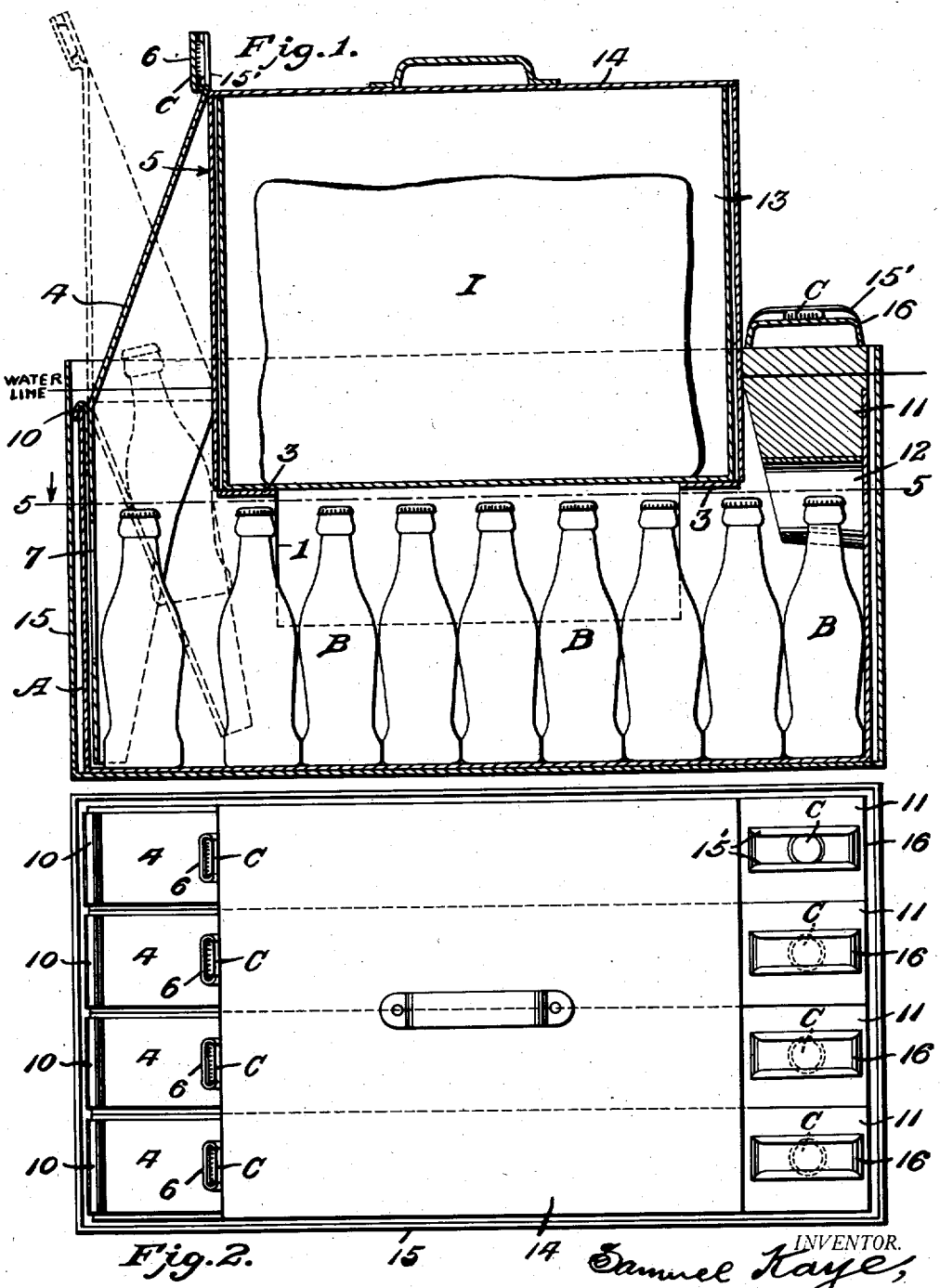
INVENTOR.
Samuel Kaye,
BY
Hood & Hahn,
ATTORNEYS July 5, 1927. Re. 16,669

S. KAYE

COOLER FOR BOTTLED GOODS

Original Filed May 25, 1922 3 Sheets-Sheet 2

15 1

Samuel Kaye, INVENTOR.

BY

Hood & Hahn.

ATTORNEYS

July 5, 1927. Re. 16,669

S. KAYE

COOLER FOR BOTTLED GOODS

Original Filed May 25, 1922 3 Sheets-Sheet 3

INVENTOR.

Samuel Kaye

BY

Hood + Hahn.

ATTORNEYS

REISSUED

Reissued July 5, 1927. Re. 16,669

UNITED STATES PATENT OFFICE.

SAMUEL KAYE, OF COLUMBUS, MISSISSIPPI, ASSIGNOR, BY MESNE ASSIGNMENTS, TO CHESTER A. FRICK, OF MUNCIE, INDIANA.

COOLER FOR BOTTLED GOODS.

Original No. 1,566,099, dated December 15, 1925, Serial No. 563,527, filed May 25, 1922. Application for reissue filed May 24, 1926. Serial No. 111,175.

My invention relates to an improvement in coolers for bottled and other sealed goods.

The object is to provide a device composed of few, simple and inexpensive parts that can be placed in any ice-box or refrigerator or other receptacle, the invention including means for facilitating receiving, moving forward and removing the articles to be cooled.

In the accompanying drawings:—

Fig. 1 is a vertical longitudinal section;

Fig. 2 is a plan view;

Figure 3:
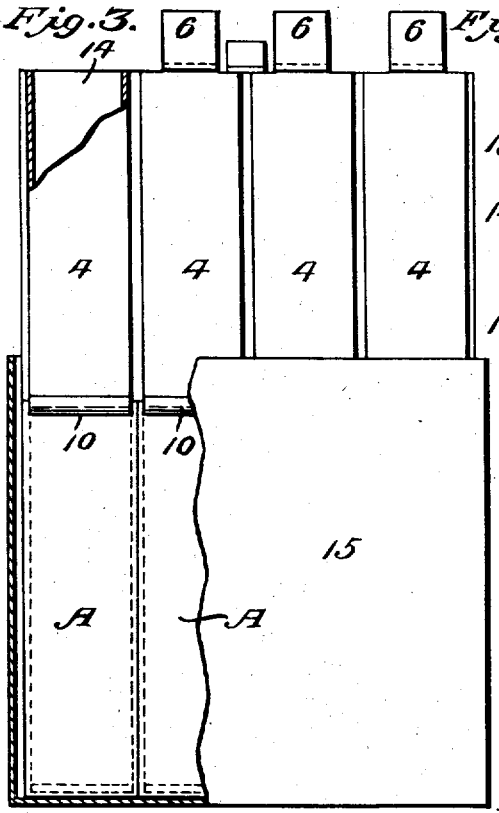
Fig. 3 is an end view with a portion broken away.

A, represents a cell or channel, preferably, although not necessarily, made of a single sheet of metal fashioned to accommodate a single row of bottles or other sealed goods. In the construction illustrated, the sides are more or less cut out, as at 1, through the center, leaving the ends 2 somewhat higher, and having shoulders 3 adjacent to the inner sides thereof at a point above the tops of the bottles B, as shown in Fig. 1.

The numeral 4 represents the chute which is removably supported in one end of the cell or channel by means of a hook 10 which rests upon the edge of the former, constituting a pivot. The bottles or other articles to be cooled are inserted through this chute, and a slot 7 formed in the lower end of the inner wall thereof has a curved lower edge 8, the slot affording lateral clearance for the bottle or other article to prevent its striking the next or preceding bottle-neck with too great force, the curved lower end of the slot catching the bottom of the bottle or other article and "breaking its fall."

The inner side 5 of the chute normally stands perpendicular, and in alignment with the inner open edge of the end of the channel or cell, and the extreme upper end of the chute may terminate in a handle 6, if desired, for the easy manipulation of the chute.

A removable cover 11 is adapted to fit and close the open top of the opposite end of the channel or cell, as shown in Fig. 1, and it also may have the added function of providing means for the removal of the bottles or other articles, and to this end it has the depending spring jaws 12 as shown in Figs. 1, 5, 8 and 9, which assume a position when the cover is in place to receive the necks of the bottles or other articles when shoved laterally between them, or by lowering the cover from above, and allowing the spring-jaws to spring aside and back into contact with the bottle-neck therebeneath. When the bottle is thus held by the jaws, it is withdrawn with the cover when the latter is lifted from the top of the cell or channel, all of which is fully illustrated in Fig. 1.

Figure 4:
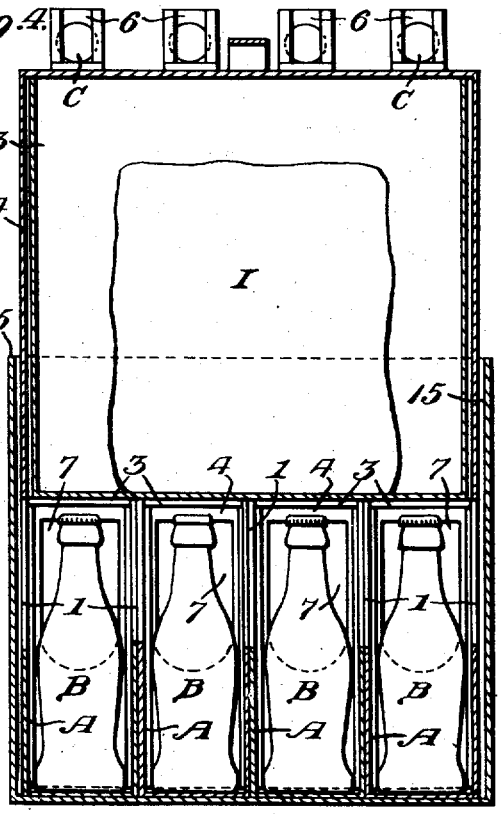
Fig. 4 is a transverse sectional view.
Figure 5:
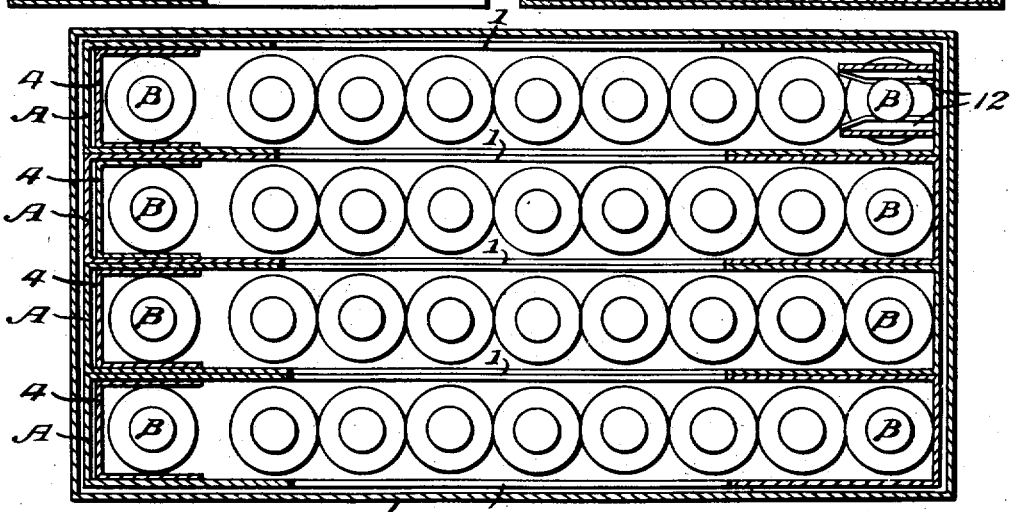
Fig. 5 is a horizontal section on the line 5—5 of Fig. 1.
Figure 6:
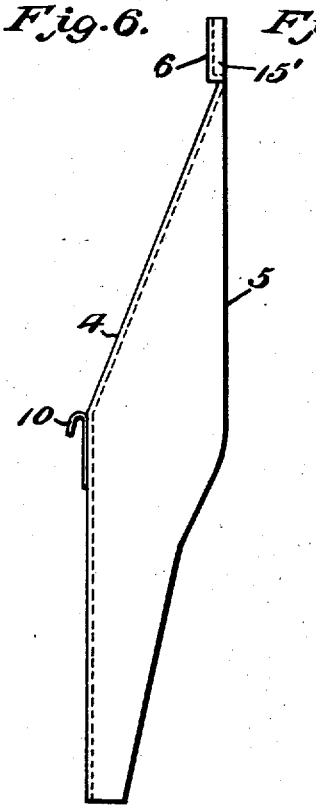
Fig. 6 is a side view of the chute.
Figure 7:
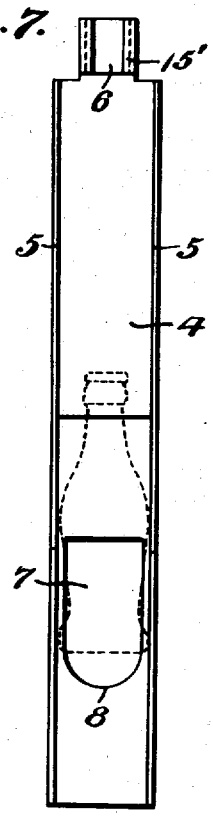
Fig. 7 is an edge view taken at right angles to Fig. 6.
Figure 8:
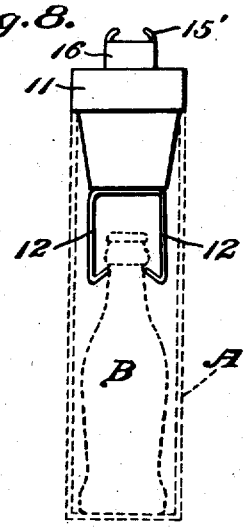
Fig. 8 is an end view of the cover for removing the articles.
Figure 9:
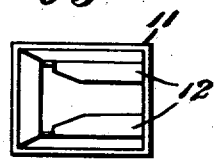
Fig. 9 is a bottom plan view of the same.
Figure 10:
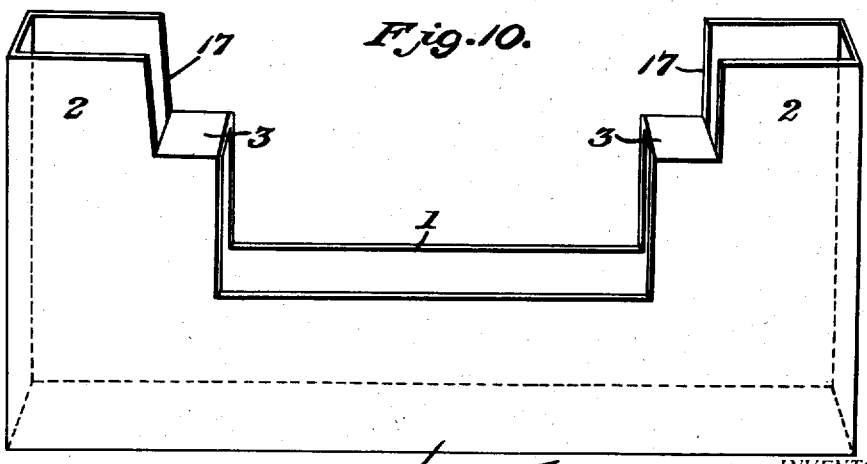
Fig. 10 is a perspective view of the cell or channel.

The ice, indicated by the letter I, as shown in Figs. 1 and 4, may rest upon a plate or other support, resting upon the shoulders 3, or, as shown in Figs. 1 and 4, it is preferably placed in a container 13, over which a cover 14 is placed, and the entire cell or channel (and as many of them as desired) are placed side by side, usually in a pan or receptacle 15 of sufficient height above the tops of the bottles or other articles to be cooled, the lower end of the ice container 13, and its cover 14, as indicated by the water line in Fig. 1, not only fully to submerge the bottles or other sealed goods, but also to form a water seal for the ice container, thus making the same airtight, preserve the ice, and at the same time conserve the cold radiating therefrom.

Different varieties of soft drinks might be inserted in different channels; as a convenient means for identifying them, the label caps C are inserted and held frictionally in a holder 15′ formed therefor in the handle 6, at the upper end of each chute and along the handle 16 of each cover, as shown in Figs. 1, 2, 4 and 8.

When the parts are assembled, it will be seen that the cover 14 of the ice or refrigerant container 13 fits and closes the open inner sides 17 of the ends 2, and the open inner side 5 of the chute, thus keeping the same substantially air-tight.

The water which submerges the bottles and forms the seal is kept in circulation due to the differences in temperature between the cooled bottle or bottles and the newly-inserted ones.

From the foregoing, it will be seen that a simple, inexpensive, efficient device is provided for cooling bottled and other sealed goods. It is understood that this device is of such a form of construction that it can be inserted in an ordinary ice-box or one constructed especially for the purpose, and as many cells or channels may be inserted side by side as the capacity of the ice-box will admit. When so placed, the ice is placed upon a plate resting upon the shoulders or in the container and enclosed by the cover, and when so placed it closes upon the inner sides of the ends of the cell or channel and chute.

The intention is to keep each channel or cell filled with bottles or articles to be cooled at all times. This insures one always resting beneath the cover 11, with its neck between the spring-jaws 12. Thus all the operator has to do to remove a bottle is to raise the cover which pulls the bottle from the cell or channel, whereupon the bottle is detached and the cover is replaced. Each time a bottle is thus removed at one end, another bottle to be cooled is inserted at the other end. To do this, the upper end of the chute is pushed back out of normal position, indicated by full lines in Fig. 1 into its abnormal or dotted line position of Fig. 1, its lower end pushing the row of bottles in its path forward. The bottle to be inserted is then lowered into the upper end of the chute, stopping and resting partly in the slot and against the shoulder of the next adjacent bottle, and, upon releasing the chute, the weight and position of the last-inserted bottle causes the chute to return to its normal position and at the same time allowing the bottle to drop into the channel. In other words, the chute is in position to receive an article and it pushes the row of bottles forward, when it is moved out of its normal position, but when moved into its normal position, the chute directs the bottle into the channel. This operation is repeated whenever a bottle is removed.

I claim:

1. A cooler for bottled goods including a channel member for containing a row of articles side by side in contact therein, and a movable filling chute associated with said member for receiving articles and normally directing them into the channel, said chute being mounted to be moved out of normal position for engagement with an article in the channel to move the articles therein forward.

2. A cooler for bottled goods including a channel member for containing a row of articles side by side in contact therein, and a movable filling chute associated with the channel member for receiving articles and when in its normal position directing said articles into the channel to be cooled, said chute having means to engage an article in the channel, and move said row of articles forward when the chute is moved out of normal position.

3. A cooler for bottled and sealed goods including a channel member, and a movable chute associated therewith constructed and arranged to receive the articles to be cooled, and so mounted that, when moved, it will shove them forward in the channel member, and a pan in which the channel or cell is placed, and of sufficient height to maintain a level of water to submerge fully the articles contained in the channel member.

4. A cooler for bottled goods including a channel member, and a movable chute connected with the channel member and adapted to receive articles and direct them into the channel to be cooled, said chute having means at its lower end for breaking the fall of the articles in its descent through the chute, said means comprising a slot, the lower end of which is of a shape to catch the edges only of the bottom of the article.

5. A cooler for bottled goods including a channel member and a chute detachably pivoted thereto, and constructed and adapted to receive the articles to be cooled, and so mounted that, when moved out of normal position, it will shove the articles forward in the channel member, means located at the opposite end of the channel member for removing the articles therefrom, the chute having means at its lower end for breaking the fall of the article in its descent through the chute, said means comprising a slot, the lower end of which is of a shape to catch the edges only of the bottom of the article.

6. A cooler for bottled and sealed goods including a channel member and a chute movably associated therewith, and constructed and adapted to receive the articles to be cooled, and so mounted that, when moved out of normal position, it will shove the articles forward in the channel member, means located at the opposite end of the channel member for removing the articles therefrom, the inner edge of the chute being open and perpendicular when in normal position, and a refrigerant container supported over the channel member and against one wall of which an open side of the chute rests when in normal position forming a closure for the latter.

7. A cooler for liquid and sealed goods including a channel member reduced in height through the center, and the ends having open inner walls and supports at the lower ends of the open portions, a bottle chute located at one end of said channel member with an open inner side, the edges of which are perpendicular and in alignment with the open edges of the adjacent portion of the channel member, and an ice container adapted to rest upon the supports and having a portion to form a closure for the open inner sides of the ends of the channel member and the chute.

8. A cooler for bottled goods including a channel member, and a movable chute associated therewith adapted to receive the articles and so mounted that when moved in one direction it will shove the articles forward in the channel preparatory to the reception of the next article.

9. A cooler for bottled goods, including, in combination, a channel member, a movable, open-sided bottle chute associated therewith so mounted as to have the double function of receiving the bottles, and, when moved in one direction, of shoving the bottles forward out of the way preparatory for the reception of the next bottle, and an ice container having a portion which closes the open side of the chute when the parts are in their normal position.

10. A cooler for bottles comprising a container constructed to contain a bottle submerging and refrigerating fluid, a channelled guide constructed to removably receive and guide a plurality of bottles side by side and in an upright position in said fluid, a pusher adjacent the receiving end of the guide for engaging the last bottle of the row supported by said guide and means permitting said pusher and guide to have a relative reciprocating movement equal to the width of a removed bottle.

11. A cooler for bottles including a container constructed to contain a bottle submerging and refrigerating fluid, a guide accessible at its opposite ends to permit the insertion therein and removal therefrom of the bottles axially and constructed to support and guide a plurality of bottles in an upright position in a row side by side, a pusher adjacent the receiving end of the guide for engaging the last bottle of the row supported by said guide and means permitting said pusher and guide to have a relative reciprocating movement equal to the width of a removed bottle to permit when reciprocation takes place in one direction the insertion axially of a bottle in the guide and when reciprocation takes place in the opposite direction the movement of the entire row of bottles toward the delivery end of the guide.

12. A cooler for bottles including a container constructed to contain a bottle submerging and refrigerating fluid, a guide constructed to support and guide a row of bottles side by side in contact and in an upright position, a pusher adjacent the rear end of said guide engaging the last bottle of the row supported by said guide and means permitting said guide and pusher to have a relative reciprocating movement equal to the width of a removed bottle and move the entire row through said guide when reciprocation takes place in one direction and permitting a bottle to drop into said guide when reciprocation takes place in the opposite direction.

13. A cooler for bottled goods including a channel constructed to support a row of bottles side by side in contact and in an upright position and constructed to deliver and receive bottles at its opposite ends axially and guiding and propelling means adjacent the rear end of said chute constructed to guide a bottle axially into said chute, said chute and means having relative reciprocable movement which causes when reciprocation takes place in one direction the engagement of a bottle with said means to move the entire row of bottles forward through said chute and which when reciprocation takes place in an opposite direction permits a bottle to drop axially into said chute in front of said means.

In witness whereof, I, SAMUEL KAYE, have hereunto set my hand at Columbus, Mississippi, this 21st day of May, A. D. one thousand nine hundred and twenty six.

SAMUEL KAYE.